(12) United States Patent
Günther et al.

(10) Patent No.: US 10,589,460 B2
(45) Date of Patent: Mar. 17, 2020

(54) METHOD AND DEVICE FOR PRODUCING THREE-DIMENSIONAL MODELS

(71) Applicant: Voxeljet AG, Friedberg (DE)

(72) Inventors: Johannes Günther, Augsburg (DE); Daniel Günther, München (DE); Andreas Hartmann, Stadtbergen (DE)

(73) Assignee: VOXELJET AG, Friedberg (DE)

( * ) Notice: Subject to any disclaimer, the term of this patent is extended or adjusted under 35 U.S.C. 154(b) by 505 days.

(21) Appl. No.: 14/382,197

(22) PCT Filed: Feb. 28, 2013

(86) PCT No.: PCT/DE2013/000106
§ 371 (c)(1),
(2) Date: Aug. 29, 2014

(87) PCT Pub. No.: WO2013/131505
PCT Pub. Date: Sep. 12, 2013

(65) Prior Publication Data
US 2015/0042018 A1    Feb. 12, 2015

(30) Foreign Application Priority Data
Mar. 6, 2012 (DE) .................. 10 2012 004 213

(51) Int. Cl.
*B29C 64/165* (2017.01)
*B29C 64/153* (2017.01)
(Continued)

(52) U.S. Cl.
CPC .......... *B29C 64/165* (2017.08); *B22F 3/1055* (2013.01); *B29C 64/153* (2017.08);
(Continued)

(58) Field of Classification Search
None
See application file for complete search history.

(56) References Cited

U.S. PATENT DOCUMENTS

| 3,913,503 A | 10/1975 | Becker |
| 4,247,508 A | 1/1981 | Housholder |

(Continued)

FOREIGN PATENT DOCUMENTS

| AU | 720255 B2 | 5/2000 |
| CN | 101146666 A | 3/2008 |

(Continued)

OTHER PUBLICATIONS

US 4,937,420 A, 06/1990, Deckard (withdrawn)
(Continued)

*Primary Examiner* — Seyed Masoud Malekzadeh
*Assistant Examiner* — Manley L Cummins, IV
(74) *Attorney, Agent, or Firm* — The Dobrusin Law Firm (57) ABSTRACT

The present invention relates to a method for producing three-dimensional objects based on computer data by repeated application in layers of a medium containing particulate material and selective solidification of the medium, whereby a feedstock made of medium in a build space is provided and a layer application of the medium takes place on a surface of the feedstock bordering the build space at an angle β and a solidification according to computer data occurs by use of a solidification unit, characterized in that the feedstock is not moved during build-up of the object.

20 Claims, 8 Drawing Sheets

(51) Int. Cl.
  *B29C 64/20* (2017.01)
  *B22F 3/105* (2006.01)
  *B33Y 10/00* (2015.01)
  *B33Y 30/00* (2015.01)

(52) U.S. Cl.
  CPC .............. *B29C 64/20* (2017.08); *B33Y 10/00* (2014.12); *B33Y 30/00* (2014.12); *B22F 2003/1056* (2013.01); *Y02P 10/295* (2015.11)

(56) References Cited

U.S. PATENT DOCUMENTS

| | | | |
|---|---|---|---|
| 4,575,330 A | 3/1986 | Hull | |
| 4,591,402 A | 5/1986 | Evans et al. | |
| 4,600,733 A | 7/1986 | Ohashi et al. | |
| 4,665,492 A | 5/1987 | Masters | |
| 4,669,634 A | 6/1987 | Leroux | |
| 4,711,669 A | 12/1987 | Paul et al. | |
| 4,752,352 A | 6/1988 | Feygin | |
| 4,752,498 A | 6/1988 | Fudim | |
| 4,863,538 A | 8/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,031,120 A | 7/1991 | Pomerantz et al. | |
| 5,047,182 A | 9/1991 | Sundback et al. | |
| 5,053,090 A | 10/1991 | Beaman et al. | |
| 5,059,266 A | 10/1991 | Yamane et al. | |
| 5,076,869 A | 12/1991 | Bourell et al. | |
| 5,120,476 A | 6/1992 | Scholz | |
| 5,126,529 A | 6/1992 | Weiss et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,229,209 A | 7/1993 | Gharapetian et al. | |
| 5,248,456 A | 8/1993 | Evans, Jr. et al. | |
| 5,252,264 A | 10/1993 | Forderhase et al. | |
| 5,263,130 A | 11/1993 | Pomerantz et al. | |
| 5,269,982 A | 12/1993 | Brotz | |
| 5,284,695 A | 2/1994 | Barlow et al. | |
| 5,296,062 A | 3/1994 | Bourell et al. | |
| 5,316,580 A | 5/1994 | Deckard | |
| 5,324,617 A | 6/1994 | Majima et al. | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,398,193 A | 3/1995 | deAngelis | |
| 5,418,112 A | 5/1995 | Mirle et al. | |
| 5,427,722 A | 6/1995 | Fouts et al. | |
| 5,431,967 A | 7/1995 | Manthiram et al. | |
| 5,433,261 A | 7/1995 | Hinton | |
| 5,482,659 A | 1/1996 | Sauerhoefer | |
| 5,490,962 A | 2/1996 | Cima et al. | |
| 5,503,785 A | 4/1996 | Crump et al. | |
| 5,506,607 A | 4/1996 | Sanders, Jr. et al. | |
| 5,518,060 A | 5/1996 | Cleary et al. | |
| 5,518,680 A | 5/1996 | Cima et al. | |
| 5,555,176 A | 9/1996 | Menhennett et al. | |
| 5,573,721 A | 11/1996 | Gillette | |
| 5,589,222 A | 12/1996 | Thometzek et al. | |
| 5,597,589 A | 1/1997 | Deckard | |
| 5,616,294 A | 4/1997 | Deckard | |
| 5,616,631 A | 4/1997 | Kiuchi et al. | |
| 5,637,175 A | 6/1997 | Feygin et al. | |
| 5,639,070 A | 6/1997 | Deckard | |
| 5,639,402 A | 6/1997 | Barlow et al. | |
| 5,647,931 A | 6/1997 | Retallick et al. | |
| 5,658,412 A | 8/1997 | Retallick et al. | |
| 5,665,401 A | 9/1997 | Serbin et al. | |
| 5,717,599 A | 2/1998 | Menhennett et al. | |
| 5,730,925 A | 3/1998 | Mattes et al. | |
| 5,740,051 A | 4/1998 | Sanders, Jr. et al. | |
| 5,747,105 A | 5/1998 | Haubert | |
| 5,749,041 A | 5/1998 | Lakshminarayan et al. | |
| 5,753,274 A | 5/1998 | Wilkening et al. | |
| 5,807,437 A | 9/1998 | Sachs et al. | |
| 5,824,250 A | 10/1998 | Whalen | |
| 5,837,960 A | 11/1998 | Lewis et al. | |
| 5,851,465 A | 12/1998 | Bredt | |
| 5,884,688 A | 3/1999 | Hinton et al. | |
| 5,902,441 A | 5/1999 | Bredt et al. | |
| 5,902,537 A | 5/1999 | Almquist et al. | |
| 5,904,889 A | 5/1999 | Serbin et al. | |
| 5,934,343 A | 8/1999 | Gaylo et al. | |
| 5,940,674 A | 8/1999 | Sachs et al. | |
| 5,943,235 A | 8/1999 | Earl et al. | |
| 5,989,476 A | 11/1999 | Lockard et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,048,954 A | 4/2000 | Barlow et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,164,850 A | 12/2000 | Speakman | |
| 6,165,406 A | 12/2000 | Jang et al. | |
| 6,169,605 B1 | 1/2001 | Penn et al. | |
| 6,175,422 B1 | 1/2001 | Penn et al. | |
| 6,193,922 B1 | 2/2001 | Ederer | |
| 6,210,625 B1 | 4/2001 | Matsushita | |
| 6,216,508 B1 | 4/2001 | Matsubara et al. | |
| 6,217,816 B1 | 4/2001 | Tang | |
| 6,243,616 B1 | 6/2001 | Droscher et al. | |
| 6,259,962 B1 | 7/2001 | Gothait | |
| 6,270,335 B2 | 8/2001 | Leyden et al. | |
| 6,305,769 B1 | 10/2001 | Thayer et al. | |
| 6,318,418 B1 | 11/2001 | Grossmann et al. | |
| 6,316,060 B1 | 12/2001 | Elvidge et al. | |
| 6,335,052 B1 | 1/2002 | Suzuki et al. | |
| 6,335,097 B1 | 1/2002 | Otsuka et al. | |
| 6,350,495 B1 | 2/2002 | Schriener et al. | |
| 6,355,196 B1 | 3/2002 | Kotnis et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,405,095 B1 | 6/2002 | Jang et al. | |
| 6,416,850 B1 | 7/2002 | Bredt et al. | |
| 6,423,255 B1 | 7/2002 | Hoechsmann et al. | |
| 6,460,979 B1 | 10/2002 | Heinzl et al. | |
| 6,476,122 B1 | 11/2002 | Leyden | |
| 6,485,831 B1 | 11/2002 | Fukushima et al. | |
| 6,500,378 B1 | 12/2002 | Smith | |
| 6,554,600 B1 | 4/2003 | Hofmann et al. | |
| 6,596,224 B1 | 7/2003 | Sachs et al. | |
| 6,610,429 B2 | 8/2003 | Bredt et al. | |
| 6,616,030 B2 | 9/2003 | Miller | |
| 6,658,314 B1 | 12/2003 | Gothait | |
| 6,672,343 B1 | 1/2004 | Perret et al. | |
| 6,713,125 B1 | 3/2004 | Sherwood et al. | |
| 6,722,872 B1 | 4/2004 | Swanson et al. | |
| 6,733,528 B2 | 5/2004 | Abe et al. | |
| 6,742,456 B1 | 6/2004 | Kasperchik et al. | |
| 6,764,636 B1 | 7/2004 | Allanic et al. | |
| 6,827,988 B2 | 12/2004 | Krause et al. | |
| 6,830,643 B1 | 12/2004 | Hayes | |
| 6,838,035 B1 | 1/2005 | Ederer et al. | |
| 6,855,205 B2 | 2/2005 | McQuate et al. | |
| 6,896,839 B2 | 5/2005 | Kubo et al. | |
| 6,972,115 B1 | 12/2005 | Ballard | |

(56) References Cited

U.S. PATENT DOCUMENTS

| | | |
|---|---|---|
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,790,096 B2 | 9/2010 | Merot et al. |
| 7,795,349 B2 | 9/2010 | Bredt et al. |
| 7,799,253 B2 | 9/2010 | Höchsmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 * | 9/2013 | Uckelmann ........ A61C 13/0013 264/16 |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Noel et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0280185 A1 * | 12/2005 | Russell ................ B28B 1/001 264/308 |
| 2005/0288813 A1 * | 12/2005 | Yang .................. B22F 3/1055 700/119 |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 * | 1/2008 | Ederer ................ B33Y 50/02 264/460 |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0211132 A1 * | 9/2008 | Feenstra ............. B22F 3/1055 264/113 |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007048 A1 | 1/2010 | Larrson et al. |
| 2010/0007062 A1 | 1/2010 | Larsson et al. |
| 2010/0207288 A1 * | 8/2010 | Dini .................... B28B 1/001 264/33 |
| 2010/0212584 A1 | 8/2010 | Ederer et al. |
| 2010/0243123 A1 | 9/2010 | Ederer et al. |
| 2010/0244301 A1 | 9/2010 | Ederer et al. |

(56) References Cited

U.S. PATENT DOCUMENTS

| | | |
|---|---|---|
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0101746 A1* | 4/2013 | Keremes ............... B22F 3/1055 427/457 |
| 2013/0108726 A1* | 5/2013 | Uckelmann ......... B29C 67/0007 425/174.4 |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0065194 A1 | 3/2014 | Yoo |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1* | 10/2014 | Hartmann ............. B29C 64/106 264/401 |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0050378 A1 | 2/2017 | Ederer |
| 2017/0106595 A1 | 4/2017 | Gunther et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0326662 A1 | 11/2018 | Gunther et al. |
| 2018/0369910 A1 | 12/2018 | Gunter et al. |
| 2019/0084229 A1 | 2/2019 | Ederer et al. |
| 2019/0047218 A1 | 3/2019 | Gunther |

FOREIGN PATENT DOCUMENTS

| | | | |
|---|---|---|---|
| DE | 3221357 A1 | 12/1983 | |
| DE | 3930750 C2 | 3/1991 | |
| DE | 4102260 A1 | 7/1992 | |
| DE | 4305201 C1 | 4/1994 | |
| DE | 4 325 573 | 2/1995 | |
| DE | 29506204.5 U1 | 6/1995 | |
| DE | 4440397 | 9/1995 | |
| DE | 19525307 A1 | 1/1997 | |
| DE | 19530295 C1 | 1/1997 | |
| DE | 19528215 A1 | 2/1997 | |
| DE | 19533960 A1 | 3/1997 | |
| DE | 29701279 U1 | 5/1997 | |
| DE | 19545167 A1 | 6/1997 | |
| DE | 69031808 T2 | 4/1998 | |
| DE | 19853834 | 5/2000 | |
| DE | 69634921 T2 | 12/2005 | |
| DE | 201 22 639 U1 | 11/2006 | |
| DE | 10 2006 040 305 A1 | 3/2007 | |
| DE | 102006029298 A1 | 12/2007 | |
| DE | 102006030350 A1 | 1/2008 | |
| DE | 102007040755 A1 | 3/2009 | |
| DE | 102007047326 A1 | 4/2009 | |
| DE | 102010015451 A1 | 10/2011 | |
| DE | 102011053205 A1 | 3/2013 | |
| DE | 102015006363 A1 | 12/2016 | |
| EP | 361847 B1 | 4/1990 | |
| EP | 0431924 B1 | 6/1991 | |
| EP | 1377389 A2 * | 1/2004 | ........... B05C 11/023 |
| EP | 1415792 | 5/2004 | |
| EP | 1457590 A | 9/2004 | |
| EP | 1872928 A1 | 1/2008 | |
| EP | 2289462 A1 | 3/2011 | |
| GB | 2297516 A | 8/1996 | |
| JP | S62275734 A | 11/1987 | |
| JP | 2003136605 A | 3/2004 | |
| JP | 2004082206 A | 3/2004 | |
| JP | 2009202451 A | 9/2009 | |
| WO | 01/40866 A2 | 6/2001 | |
| WO | 2001/078969 A2 | 10/2001 | |
| WO | WO-02083323 A2 * | 10/2002 | ........... B05C 11/023 |
| WO | 2004/014637 A1 | 2/2004 | |
| WO | 2006/100166 A1 | 9/2006 | |
| WO | 2008/049384 A1 | 5/2008 | |
| WO | 2008061520 A2 | 5/2008 | |
| WO | 2011063786 A1 | 6/2011 | |
| WO | 2013075696 A1 | 5/2013 | |
| WO | 2014090207 A1 | 6/2014 | |
| WO | 2014166469 A1 | 10/2014 | |
| WO | 2015081926 A1 | 6/2015 | |
| WO | 2015085983 A2 | 6/2015 | |
| WO | 2015090265 A1 | 6/2015 | |
| WO | 2015090567 A1 | 6/2015 | |
| WO | 2015096826 A1 | 7/2015 | |
| WO | 2015078430 A1 | 8/2015 | |
| WO | 2015149742 A1 | 10/2015 | |
| WO | 2015180703 A1 | 12/2015 | |
| WO | 2016019937 A1 | 2/2016 | |
| WO | 2016019942 A1 | 2/2016 | |
| WO | 2016058577 A1 | 4/2016 | |
| WO | 2016095888 A1 | 6/2016 | |
| WO | 2016101942 A1 | 6/2016 | |
| WO | 2016146095 A1 | 9/2016 | |
| WO | 2017/008777 A1 | 1/2017 | |

OTHER PUBLICATIONS

International Search Report, Application No. PCT/DE2013/000106, dated Jun. 12, 2013.

International Preliminary Report on Patentability and Translation of Written Opinion of the International Search Authority, Application No. PCT/DE2013/000106, dated Sep. 9, 2014.

Marcus et al., Solid Freedom Fabrication Proceedings, Nov. 1993.

(56) References Cited

OTHER PUBLICATIONS

Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-33.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary.
EOS Operating Manual for Laser Sintering Machine, Part 1 with Brief Summary, Feb. 22, 2005.
EOS Operating Manual for Laser Sintering Machine, Part 2 with Brief Summary, Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, pp. 2-15.

\* cited by examiner

METHOD AND DEVICE FOR PRODUCING THREE-DIMENSIONAL MODELS

The invention relates to a method for manufacturing three-dimensional models as expressed in the generic concept of patent claim 1 as well as a device as expressed in the generic concept of patent claim 8.

A method for producing three-dimensional objects from computer data is described in the European patent specification EP 0 431 924 B1. In this method, a particulate material is deposited in a thin layer onto a platform, and a binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which the remaining powder is removed, for example by brushing.

Other particulate material-supported rapid prototyping processes work in a similar manner, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

A common feature of all the above-mentioned embodiments is that the manufacturing process in build containers limits the size and weight of the desired products, this especially being due to the build container.

A method enabling the production of moldings of greater lengths is described in the German patent application DE 10 2010 015 451 A1. Proposed for this purpose is to deposit a feedstock of particulate material on a conveyor belt and to build three-dimensional components in layers upon it. The components can therefore be constructed continuously and, for example, unpacked by the conveyor belt after exiting from the device. With this method, however, the component length is limited by the length of the device used.

The object of the present invention is to provide a 3D printing method and device and a method enabling the manufacture of very long and heavy components and mitigate the disadvantages of the prior art or even avoid them entirely.

This object is achieved by a method according to patent claim 1 and a device according to patent claim 8.

According to the present invention, a method for producing three-dimensional objects based on computer data is provided by repeated application in layers of a medium containing particulate material and selective solidification of the medium, whereby a feedstock on a build space is provided and a layer application of the medium by means of a coating unit takes place at an angle $\beta$ upon the bordering surface of the feedstock and a solidification according to computer data occurs by use of a solidification unit and whereby the feedstock is not moved during build-up of the objects.

It is now proposed to continuously build upon a stationary feedstock whereby, if necessary, the device parts used for application and, if necessary, selective solidification, are moved in relation to the feedstock.

Preferably, the coating unit and/or solidification unit have an angle of $\alpha<90°$ to the build plane of the build space and are moved in relation to the feedstock.

According to one especially preferred embodiment of the present invention, the angle $\alpha$ is smaller than the angle $\beta$.

Furthermore, it is also possible that the angle $\alpha$ is larger than the angle $\beta$.

With one method according to the present invention, it is now possible that the manufactured objects can be unpacked from the particulate material without interrupting the build process of the feedstock and execution of solidification. For example, the unpacking could occur continuously.

The term feedstock, likewise called aggregate material, is generally understood to be a mixture of solid particles (for example granulates) that is loosely mixed.

The principle force acting between the particles of a feedstock is friction as well as adhesion. In the case of non-round particles there is also the factor of self-blocking, and in the case of rough particles micro-grouting, even electrostatic forces under certain circumstances.

Due to the influence of gravity, an equilibrium of shearing stresses at the contact surfaces is set up in the aggregate material by which the feedstock achieves its stable shape.

The particles can have various particle sizes and compositions. For example, they may be composed of pure substances or composed of mixtures connected solidly to each other.

If aggregate materials are set in motion, they behave like fluids and can be described in terms of fluid dynamic formulas.

The angle $\beta$ can therefore also be called the "pouring angle".

According to the present invention, a coater is provided at the formation of the pouring cone surface, which can be either flat or curved, for instance at the front side of the feedstock, and this coater applies new particle material to the feedstock.

Preferably, it may be provided that the coater moves over the feedstock at an angle $\alpha$ to the build surface that is preferentially exactly horizontally oriented, said angle smaller than the pouring angle $\beta$ of the particle material. According to one preferred embodiment of the invention, it is ensured that the layer of newly deposited particulate material remains at the desired area and does not slip off.

Moreover, it may prove advantageous if additional limitation walls are established during build-up of the objects. One such embodiment has the advantage that by means of it the feedstock can be limited, if needed, by means of the limitation walls created by the solidification unit.

Depending on the embodiment of the present method, it may prove advantageous that the coating unit and/or solidification unit essentially moves horizontally. In addition, it may likewise be advantageous that the coating unit and/or solidification unit essentially moves in an involute manner.

Preferably, the coating unit and/or solidification unit moves on a coordinate system placed at an angle $\alpha$ to the build plane of the build space and parallel to the build plane of the build space.

According to an especially preferred embodiment of the present invention, supplemental structures (88) are formed that hinder a slipping down of the medium in the material cone.

A device according to the present invention producing three-dimensional objects based on computer data by repeated application in layers of a medium containing particulate material and selective solidification of the medium, having a feedstock made of the medium in a build space and a coating unit for layer application of the medium at an angle β upon the bordering surface of the feedstock and additionally having a solidification unit for solidifying the medium according to computer data. However, the feedstock does not move during build-up of the object.

Preferably, in a device according to the invention, the coating unit and/or solidification unit has an angle of α<90° to the horizontal plane of the build space and is capable of moving relative to the feedstock. Depending on the embodiment, the angle α can thereby be smaller, greater or equal to the angle β.

In a device according to the invention, the solidification unit can have a droplet generator. Furthermore it may also possible that it has a radiation source.

The coating unit and/or solidification unit may preferably be movable on a coordinate system placed at an angle α to a build plane of the build space and movable parallel to the build plane of the build space.

According to one preferred embodiment, the build space is a floor, preferably a work bay floor of a production facility. It is furthermore possible that the build space has a building platform and/or slidable floors and/or an intermittent conveyor belt along the linear guide.

It may also be preferable that the unit including the coating unit and solidification unit is horizontally moved on tracks.

Moreover, it may prove advantageous that the unit rests on walls that it builds as it proceeds.

The angle α can advantageously be adjusted on the device in order to harmonize the device to the particulate material. In addition, on this side a device is mounted that selectively solidifies the particulate material alongside the particulate material plane defined by the coating unit. This solidification unit can be a print head which releases small fluid droplets on the particulate material with the result that the particulate material solidifies there in a locally demarcated manner. Other devices can alternatively be employed, such as a radiation source for high energy beams.

After completion of a layer comprised of a coating and subsequent solidification, the device is transported in the direction of the forming feedstock a distance amounting to the layer thickness. Depending on the size, the device can be conveyed e.g. on a rail system. Slippage-free drives (for example) rack-and-pinion systems must ensure precision of the movement.

The feedstock can be constructed directly on the floor upon which the device is operated. This can also be the work bay floor of a production facility. However, manufacture may also take place outdoors if the size of the device and the desired components require such. The device can likewise function on interchangeable platforms.

A substantial advantage of the method and the device is the simplicity of the technical execution. In comparison to the prior art, build containers for reception of the feedstock are dispensed with. The feedstock is also not moved relative to any wall, which reduces wear as well as the driving force and drive performance and mitigates tendencies to malfunctions in the feedstock.

To prevent slipping down of the feedstock, a grid structure (30) can be printed along with it. This stabilizes the particulate material feedstock and also helps to hinder the uncontrolled discharge of the particulate material in the break-out zone later on.

The length of the feedstock from the printing unit right up to the break-out zone depends on the respective solidification process. This can be determined, for example, by simply measuring. The length can be designed in a way that the feedstock remains a certain retention period in the contiguous situation to e.g. give the liquid time to react with the particulate material in order to develop adequate stability. It is also possible that the retention period can be used to cool down the feedstock in a controlled fashion from the side opposite the solidification zone. There are also conceivable cases where both effects are jointly used. In both cases, a gradient results that conforms to the layer-building and passes through the feedstock.

In contrast to methods in build containers, in this case the layers reach the break-out zone in the same sequence as they were built. The retention period can thus be held nearly constant in the particulate material feedstock for all areas. This is a great advantage since in this way the curing can proceed in a much more controlled manner and is thereby accompanied by less delay.

The break-out zone described herein and of the device is more accessible in comparison to conventional methods. If the feedstock is constructed on a work bay floor, then every mold can be easily retrieved by means of tools, forklifts or a hall crane. A large device length makes it possible to nearly arbitrarily select the time point at which to unpack.

Since the components can be laid stacked over one another in the direction of gravity, it may be required to embed the components with support structures that also have to be built and that are able to develop sufficient backing effect even in the absence of surrounding particulate material and to hold the components in position until they are removed.

If the particulate material is reusable in the process, then it can be collected in the break-out zone and again fed into the application process after a possible pass through a preparation section. In the preparation section, it may, for example, be necessary to perform a sifting of the particulate material and/or a regulated feed-in of fresh particulate material.

In the case of horizontal orientation of the conveyance plane, the solidification period, respectively, the break-out period only affects the length of the device.

Such a system enables the processing of a multitude of different materials. Possible materials also include sand, gypsum, metal particulate material or other inorganic particulate materials as well as plastic particulate material, flour and other organic particulate materials.

The system and the process permit a wide spectrum of varied applications, such as the manufacture of molds and models for metal casting as well as the production of components of the most diverse types. Likewise, an interesting advantage is that the continuous procedure also allows production of longer components without having to modify the device.

For the purpose of more detailed explanation, the invention is described in further detail below on the basis of preferred embodiments with reference to the drawings.

In the drawing:

FIG. 12a-d The various process steps of a preferred embodiment of the invention.

Figure 1:
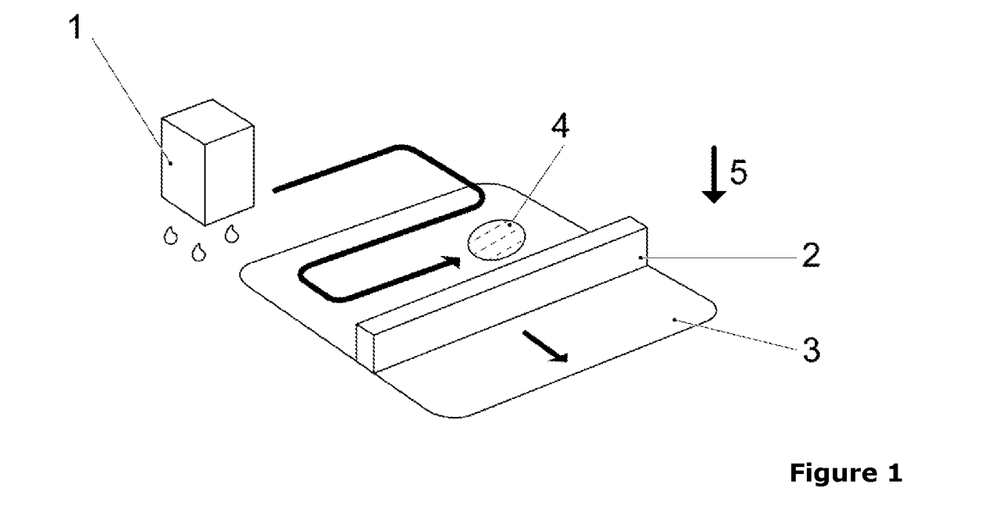
FIG. 1 An isometric view of a device according to the prior art.

FIG. 1 shows a device according to the prior art. A coating unit (2) applies a layer consisting of particulate material on a build platform (3). At the conclusion, with the aid of computer-provided data, the particulate material is selectively solidified. In FIG. 1, this area is indicated by (4). The perpendicular is indicated here by the reference symbol (5). After solidification the build platform (3) is lowered by one layer thickness and then another layer is created.

Figure 2:
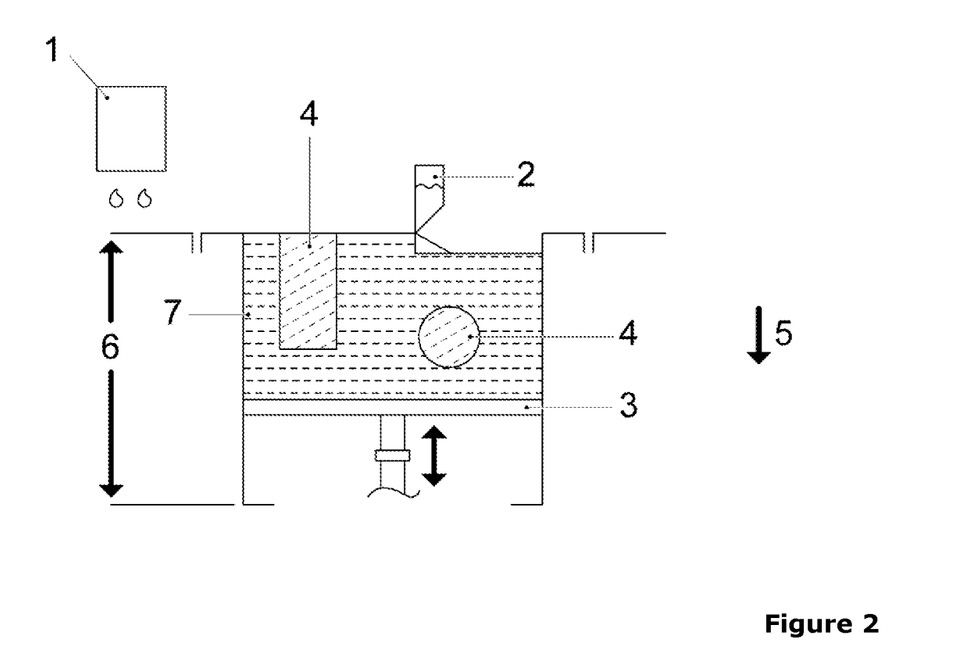
FIG. 2 A sectional view of a device according to the prior art.

In FIG. 2 the same device is depicted in sectional view. Several layers have already been created. A limiting factor during the method according to the prior art is the build container depicted in the Figure as (7). After a certain build height (6) the container (7) must be emptied or exchanged.

Figure 3:
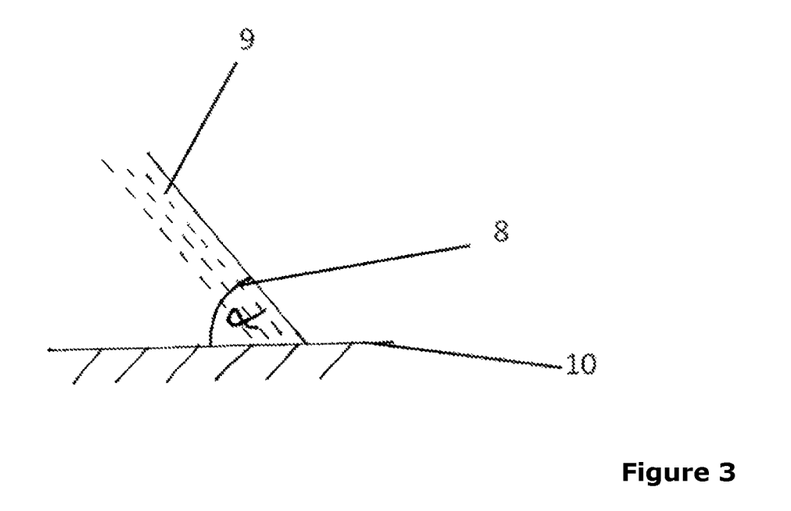
FIG. 3 An illustration of the feedstock for definition of the machine angle.

FIG. 3 illustrates a particulate material feedstock that can be made without limitations. This has a front-side plane that includes a certain angle (8) to a horizontal plane (10). The feedstock consists of individual layers (9) and can be produced as shown in patent DE 10 2010 015 451 A1. The angle (8) shown here is hereinafter called the machine angle.

Figure 4:
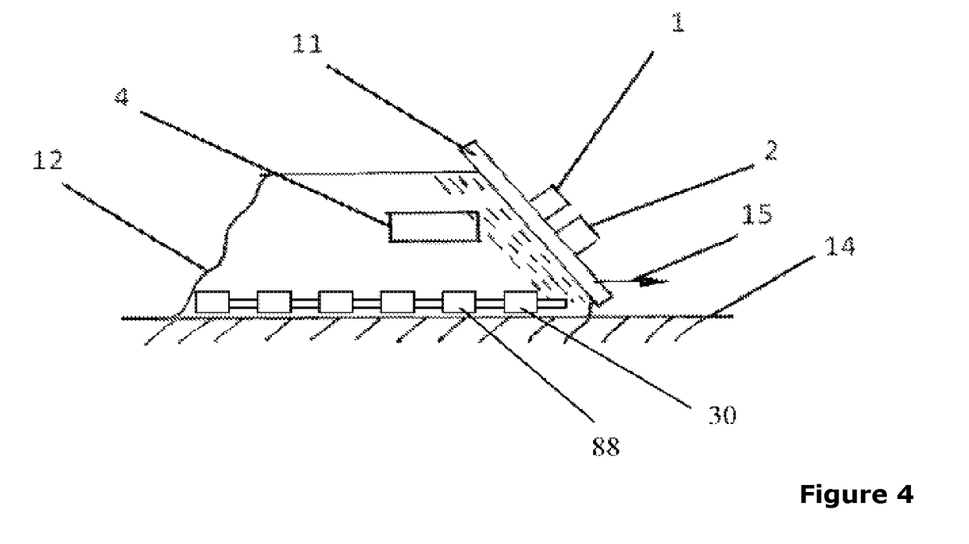
FIG. 4 A sectional view of a preferred embodiment of the invention.

FIG. 4 depicts one preferred embodiment of the invention. The Figure shows a sectional view comparable with FIG. 2. According to patent claim 1, the particulate material feedstock here is not moved relative to the machine, but rather it remains motionless. A coordinate system in the hall where the device is located is hereby fixed. On the other hand, the device moves.

After some time of system operation, the scenario represented in FIG. 4 results. With increasing build time, the material feedstock (12) becomes ever longer whereby the carrier unit (11) moves with solidification unit (1) and coating unit (2) in the build direction (15) over a horizontal plane (14). The mold parts (4) to be produced lie stationary in the feedstock.

Figure 5:
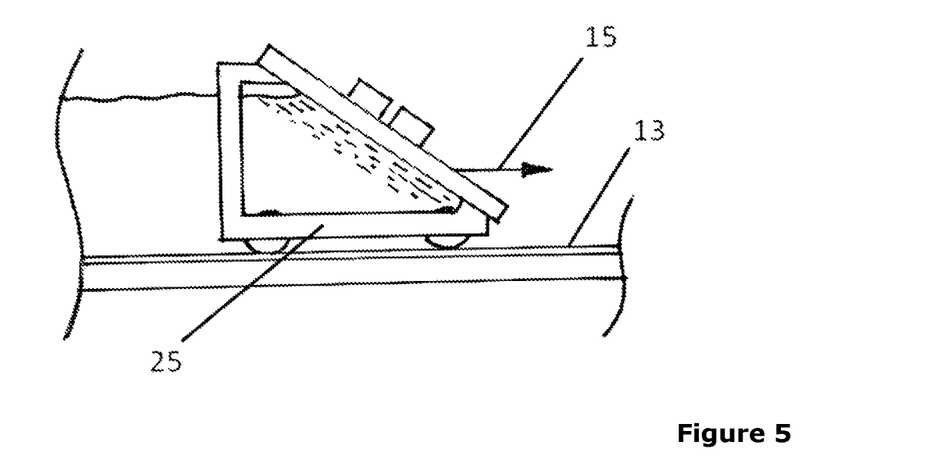
FIG. 5 A side view of one particularly preferred embodiment of the invention.

FIG. 5) shows a technical arrangement of the device. The carrier unit is hereby implemented as vehicle (25). This is guided over a rail track (13). The rail track (13) is designed according to the required degree of precision and measurement system used for position detection. Linear guidance systems can be used here for the highest degree of guidance precision and rigidity. Tracks resembling railroad tracks can be used if a high degree of precision is not required. It is also conceivable to simply use wheels to roll on plane (14), however this is connected with a corresponding amount of measurement effort.

Various mechanisms can be used as drive systems. A very high degree of motion precision and thus of the layer thickness can be achieved with combined linear units that contain a ball screw drive. Rack-and-pinion systems and preloaded cog wheels can also achieve small position deviations. Frictional drives can also be used. However, the position measurement and control must be adapted to this type of drive.

Figure 6:
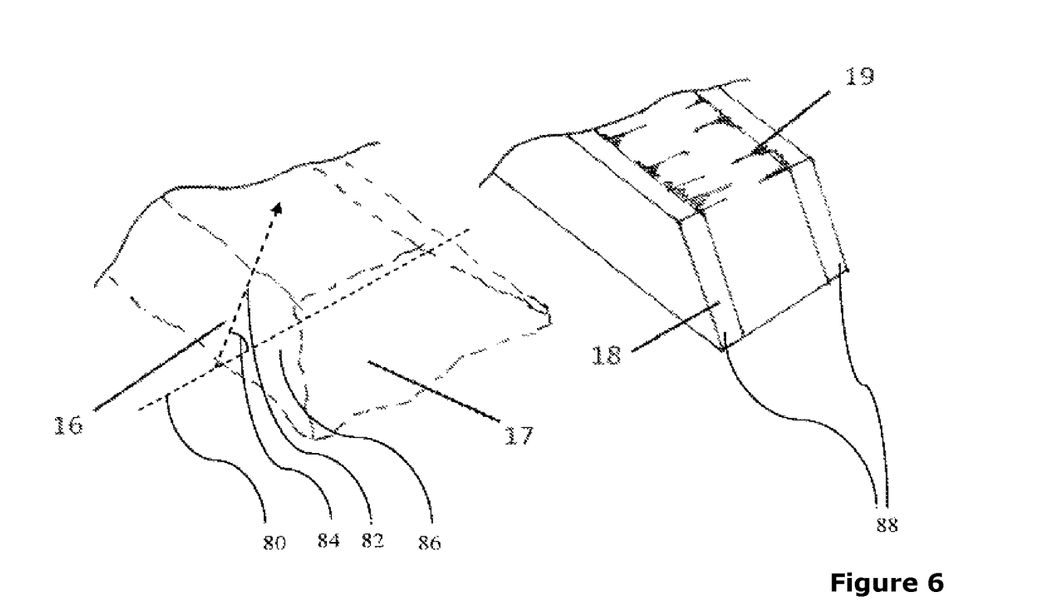
FIG. 6 An illustration of a feedstock produced according to the invention.

FIG. 6 shows a feedstock made of particulate material. Such a feedstock would be produced by a coating unit that has a horizontal slot from which the particulate material can run out. The natural angle of repose of the material results in the basic geometrical shape of a truncated pyramid. The device must be implemented correspondingly large enough to prevent penetration of the material into the rail system. As illustrated in FIG. 6, the angle between the horizontal direction 80 and the direction of incline 82 of a bordering surface 86 may be the pour angle 84 of the material. Supplemental structures 88 may be formed that hinder a slipping down of the material.

This situation can be improved with a device according to patent claim 4. In this case, the solidification unit (1) creates walls that laterally limit the feedstock. In this way, a parallelepiped is created with a significantly lower area requirement.

Depending on the type of solidification mechanism used, the unpacking of mold parts (4) can proceed after a certain amount of time after the layers are created. The solidification time and the safety distance are the determining factors for the unpacking length. The safety distance is necessary so that unpacking does not disturb the building process.

If the material feedstock (12) is constructed directly on the work bay floor (14), then it can be unpacked in an especially simple manner. For this purpose, any tools can be used, such as forklifts or cranes. The rail system (13) according to the invention must then be implemented appropriately sturdy.

Figure 7:
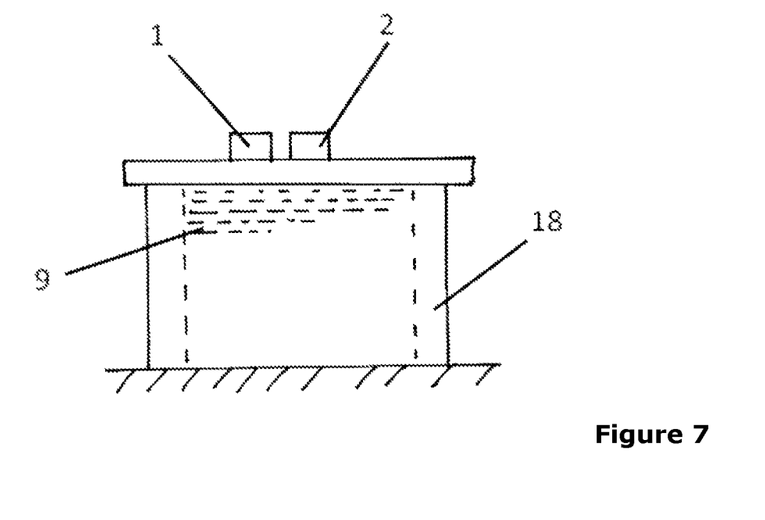
FIG. 7 A sectional view of one preferred embodiment of the invention.

A further embodiment of the invention is depicted in FIG. 7. A stationary feedstock on a horizontal plane is also used in this case. The angle between the carrier unit (11) and the horizontal plane amounts to 0 degrees here. In contrast to patent DE 10 2006 030 350 A1, the vertical movement does not take place by means of an axis system, but rather using a progression of carrier unit (11) toward the already built walls of the feedstock. The walls exhibit a special geometry that ensures precise positioning.

Figure 8A:
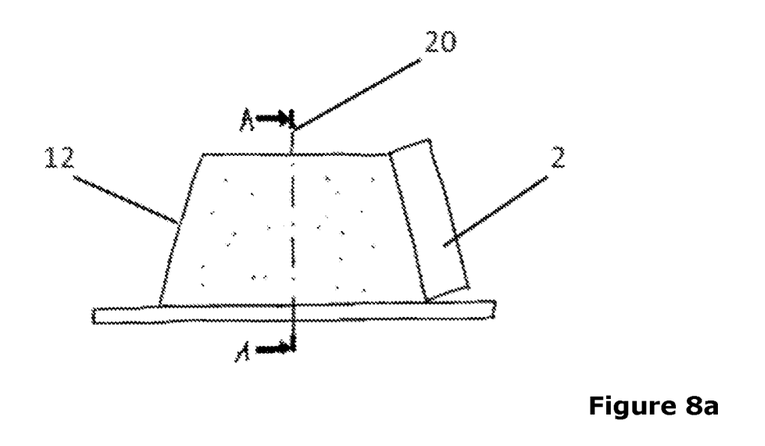
FIG. 8a A side view of another preferred embodiment of the invention, with a rotating build platform and conical powder cake.
Figure 8B:
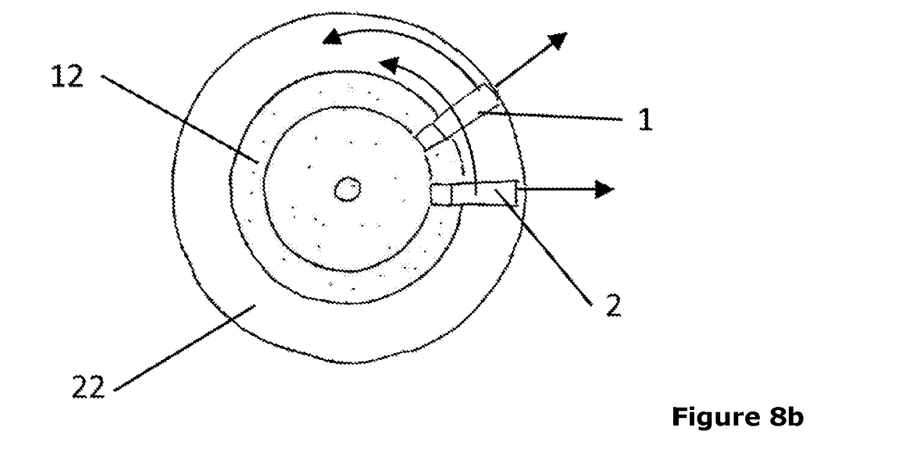
FIG. 8b A view of the embodiment of FIG. 8a from above.
Figure 9:
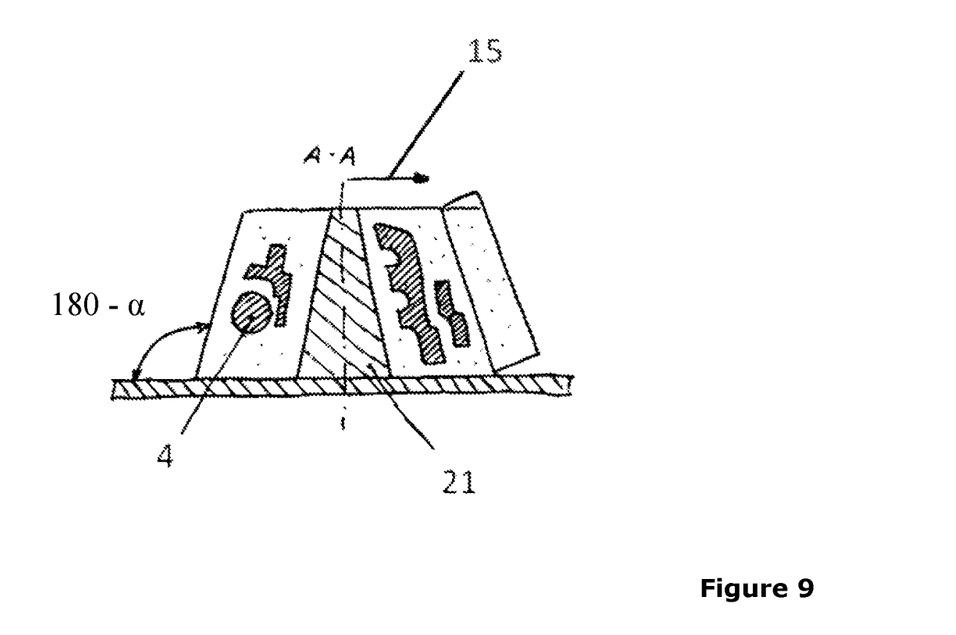
FIG. 9 A sectional view of a further preferred embodiment of the invention.

FIG. 8 and FIG. 9 depict a further embodiment of the invention according to patent claim 1. In this case and deviating from the above-mentioned embodiments, the feedstock is produced in a rotary manner and not in a linear fashion. For this purpose, the carrier unit is guided in an involute motion around machine axis (20). Compared to the above-mentioned descriptions, the coating unit is turned 90° and can be continuously operated. The solidification unit can also be continuously operated. A build cone (21) can be used to start the system. This device type requires the data for the molds (4) to be skewed not only linearly, but also according to polar coordinates.

Figure 10:
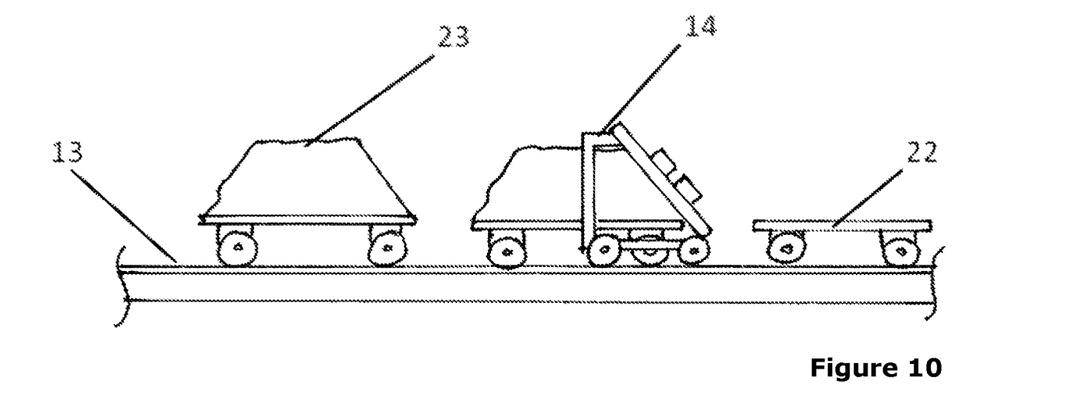
FIG. 10 A representation of one preferred embodiment of the invention with build platforms.

Instead of building the material feedstock on the work bay floor, a build platform (22) can also be used. This can also use the rail system of device (13) as depicted in FIG. 10. After the building process, the platforms can be exchanged if needed.

Figure 11:
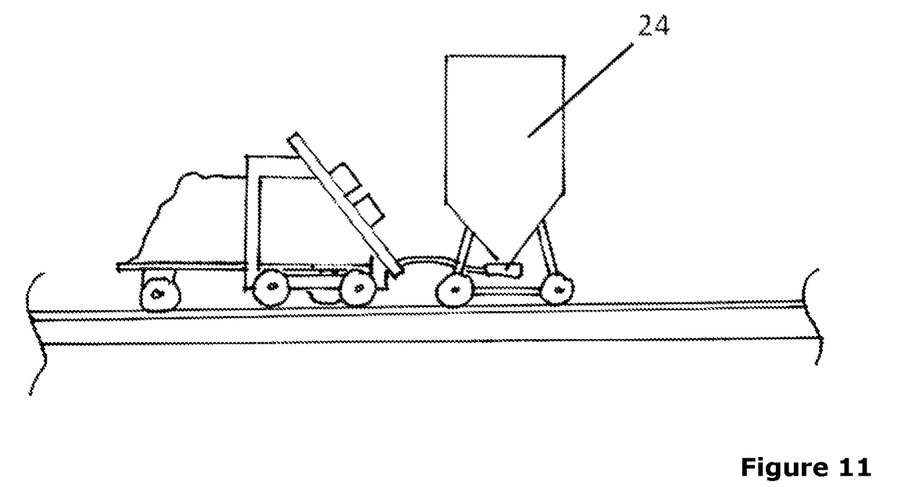
FIG. 11 A representation of one preferred embodiment of the invention with material silo.

The materials needed for the building process can be supplied to the device via flexible hoses. These materials could include e.g. particulate material, binder or electrical energy. If critical materials are used or the circumstances on-site do not allow such, then the materials can also be moved with the carrier unit. By way of example, FIG. 11 shows an accompanying particulate material silo (24) conveyed on the machine rail system.

FIG. 12a-d show a preferred embodiment of the invention in which the material feedstock (12) is built on a conveyor belt (28). The conveyor belt (28) extends over the build space (6) and an unpacking area (27).

Figure 12:
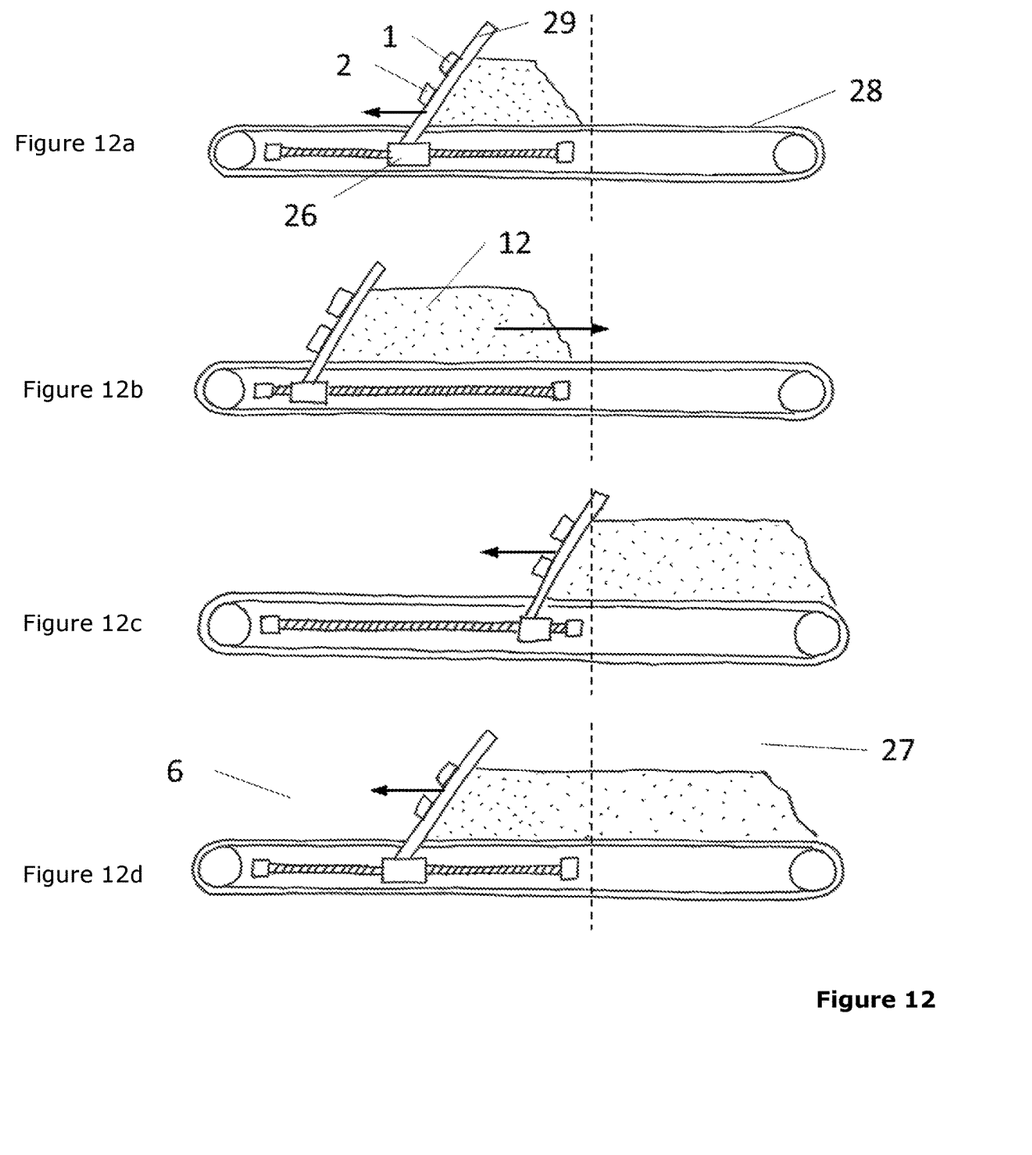

In the building process, a process plane (29) that carries the layer-generating tools (1) and (2) moves layer by layer within build space (6) by means of linear units (26).

The conveyor belt (28) remains motionless until the first build space (6) is entirely built upon.

The completed component is subsequently transported into the unpacking area (27) with the conveyor belt. At the same time, the process plane (29) moves into its initial position. If the process plane (29) and the material feedstock (12) are positioned, then the building process is immediately continued on the material feedstock (12). The completed components can be removed in unpacking area (27). While doing so, the building process does not need to stop.

LIST OF REFERENCE NUMERALS

1 Solidification unit
2 Coating unit
3 Build platform
4 Component (part of which is being built)
5 Gravitational direction
6 Build space
7 Build container
8 Machine angle
9 Layers
10 Horizontal reference plane
11 Unit with coating unit and solidification unit
12 Stationary feedstock
13 Rail system
14 Work bay floor
15 Direction of construction
16 Pouring feedstock
17 Flat area created by the coating unit
18 Wall created by solidification unit
19 Irregularly leveled area
20 Rotation axis of the device
21 Ancillary cone for starting the system
22 Build platform
23 Feedstock on the build platform
24 Material silo
25 Carrier vehicle
26 Linear drive
27 Unpacking area
28 Conveyor belt
29 Process plane

What is claimed is:

1. A method for producing one or more three-dimensional components based on computer data comprising steps of:
repeatedly applying layers, including sequential layers, of a medium containing a particulate material with a coating unit on a build surface of a feedstock made of the medium;
selectively solidifying the medium with a solidification unit,
wherein the feedstock is supported by a support surface, and the build surface has a build angle, $\alpha$, relative to the support surface, wherein the build angle is an acute angle greater than 0 degrees; and wherein the feedstock is stationary during application of sequential layers of the medium;
wherein the coating unit moves on a coordinate system placed at the build angle, angle $\alpha$, relative to the support surface while applying one of the layers; and
wherein the coating unit moves in a direction parallel to the support surface between the sequential layers.

2. The method of claim 1, wherein the feedstock has two bordering surfaces adjacent to the build surface, wherein each of the two bordering surfaces has an angle ß relative to a horizontal plane, wherein the angle ß is an acute angle greater than 0 degrees, and the method includes moving the coating unit and the solidification unit in the direction parallel to the support surface and away from the feedstock between application of the sequential layers.

3. The method of claim 1, characterized in that limiting walls are built as the process proceeds.

4. The method of claim 1, wherein a movement of the solidification unit essentially proceeds horizontally.

5. The method of claim 1, wherein supplemental structures are formed that hinder a slipping down of the medium.

6. The method of claim 1, wherein the solidification unit has a droplet generator.

7. The method of claim 1, wherein the coating unit rests on walls that the process the coating unit builds as it proceeds.

8. The method of claim 1, wherein the solidification unit has the angle $\alpha$ relative to the support surface and is moved in relation to the feedstock between the sequential layers.

9. The method of claim 8, wherein
i) the build space is a work bay floor of a production facility,
ii) the build space has a build platform,
iii) the build space includes slidable floors,
iv) the build space has an intermittent conveyor belt along linear guides,
v) or any combination of (i) through (iv);
and wherein the coating unit and solidification unit are horizontally moved on tracks.

10. The method of claim 9, wherein the coating unit rests on walls that the process the coating unit builds as it proceeds.

11. The method of claim 2, characterized in that limiting walls are built as the process proceeds.

12. The method of claim 11, wherein a movement of the solidification unit essentially proceeds horizontally.

13. The method of claim 12, wherein the solidification unit moves on the same or a different coordinate system placed at the angle $\alpha$ to the support surface while applying droplets on the particulate material and wherein the solidification unit moves parallel to the support surface between building of two sequential layers.

14. The method of claim 10, wherein the coating unit and the solidification unit move on the coordinate system placed at the angle $\alpha$ to the support surface while building one of the layers including the steps of applying and solidifying and parallel to the support surface between building of two sequential layers.

15. The method of claim 14, wherein supplemental structures are formed that hinder a slipping down of the medium.

16. The method of claim 6, wherein the coating unit and the solidification unit move on the coordinate system placed at the angle $\alpha$ to the support surface while building one of the layers including the steps of applying and solidifying and parallel to the support surface between building of two sequential layers.

17. The method of claim 2, wherein each of the bordering surfaces is neither orthogonal nor parallel with the build surface; and wherein each of the bordering surfaces extends from the support surface to a top surface of the feedstock.

18. The method of claim 1, wherein the support surface is a planar surface of a build platform, and the coating unit advances in a direction parallel to the planar surface of the build platform after applying one of the layers of the particulate material.

19. The method of claim 1, wherein the solidification unit has a radiation source.

20. The method of claim 2, herein the solidification unit has a radiation source.

* * * * *